United States Patent
Fretenburg et al.

(10) Patent No.: US 8,334,801 B2
(45) Date of Patent: Dec. 18, 2012

(54) SYSTEM AND METHOD FOR REAL-TIME LOCATING

(75) Inventors: Russell Alan Fretenburg, North Vancouver (CA); Steven Scott Kazemir, Port Coquitlam (CA); Henry Hon-You Leung, Coquitlam (CA); Derek John Pyner, Delta (CA); Charles Elmer McNeill, IV, Arlington, VA (US); David W. A. Taylor, Jr., Greensboro, NC (US)

(73) Assignee: Ensco, Inc., Falls Church, VA (US)

( * ) Notice: Subject to any disclaimer, the term of this patent is extended or adjusted under 35 U.S.C. 154(b) by 339 days.

(21) Appl. No.: 12/805,325

(22) Filed: Jul. 26, 2010

(65) Prior Publication Data

US 2012/0019413 A1 Jan. 26, 2012

(51) Int. Cl.
*G01S 13/74* (2006.01)
*G01S 13/08* (2006.01)
*G01S 13/00* (2006.01)

(52) U.S. Cl. ............... 342/125; 342/42; 342/46; 342/47; 342/118

(58) Field of Classification Search .................... 342/42, 342/46, 47, 118, 125
See application file for complete search history.

(56) References Cited

U.S. PATENT DOCUMENTS

| | | | | |
|---|---|---|---|---|
| 3,916,410 A * | 10/1975 | Elwood | .......................... | 342/458 |
| 4,278,977 A * | 7/1981 | Nossen | .......................... | 342/42 |
| 4,513,285 A * | 4/1985 | Pike et al. | .......................... | 342/125 |
| 4,703,444 A * | 10/1987 | Storms et al. | .......................... | 342/463 |
| 5,056,106 A * | 10/1991 | Wang et al. | .......................... | 375/130 |
| 5,691,922 A * | 11/1997 | McEwan et al. | .......................... | 702/158 |
| 5,912,644 A * | 6/1999 | Wang | .......................... | 342/457 |
| 5,920,287 A | 7/1999 | Belcher et al. | | |
| 5,995,046 A | 11/1999 | Belcher et al. | | |
| 6,067,039 A * | 5/2000 | Pyner et al. | .......................... | 342/125 |
| 6,121,926 A | 9/2000 | Belcher et al. | | |
| 6,127,976 A | 10/2000 | Boyd et al. | | |
| 6,170,748 B1 | 1/2001 | Hash et al. | | |
| 6,268,723 B1 | 7/2001 | Hash et al. | | |
| 6,317,082 B1 | 11/2001 | Bacon et al. | | |
| 6,349,116 B1 | 2/2002 | Hash et al. | | |
| 6,366,242 B1 | 4/2002 | Boyd et al. | | |
| 6,366,626 B1 | 4/2002 | Boyd | | |
| 6,380,894 B1 * | 4/2002 | Boyd et al. | .......................... | 342/450 |

(Continued)

OTHER PUBLICATIONS

Taylor et al., Innovative Approach to Local Area Precise Positioning Using Direct Sequence Spread Spectrum, paper presented at the Institute of Navigation National Technical Meeting, Jan. 24, 2003.

*Primary Examiner* — Jack W Keith
*Assistant Examiner* — Peter Bythrow
(74) *Attorney, Agent, or Firm* — Finnegan, Henderson, Farabow, Garrett & Dunner, L.L.P.

(57) ABSTRACT

A locating system, includes at least one initiator configured to operate at a first clock frequency, and to transmit a measurement signal including a first preamble; and at least one transponder configured to operate at a second clock frequency, to receive the measurement signal, and to transmit a response signal to the initiator, the response signal including a second preamble. The initiator is further configured to calculate, based on the response signal, a distance between the initiator and the transponder for determining a location of the transponder.

46 Claims, 8 Drawing Sheets

U.S. PATENT DOCUMENTS

| | | |
|---|---|---|
| 6,393,045 B1 | 5/2002 | Belcher et al. |
| 6,434,194 B1 | 8/2002 | Eisenberg et al. |
| 6,476,719 B2 | 11/2002 | Belcher et al. |
| 6,502,005 B1 | 12/2002 | Wrubel et al. |
| 6,577,275 B2 | 6/2003 | Turner |
| 6,593,885 B2 | 7/2003 | Wisherd et al. |
| 6,655,582 B2 | 12/2003 | Wohl et al. |
| 6,657,586 B2 | 12/2003 | Turner |
| 6,721,369 B1 | 4/2004 | Hash et al. |
| 6,744,398 B1 * | 6/2004 | Pyner et al. .................. 342/125 |
| 6,812,839 B1 | 11/2004 | Belcher et al. |
| 8,199,047 B2 * | 6/2012 | Fretenburg et al. ........... 342/145 |

* cited by examiner

| Channel Number | Frequency (MHz) |
| --- | --- |
| 1 | 2405 |
| 2 | 2410 |
| 3 | 2415 |
| 4 | 2420 |
| 5 | 2425 |
| 6 | 2430 |
| 7 | 2435 |
| 8 | 2440 |
| 9 | 2445 |
| 10 | 2450 |
| 11 | 2455 |
| 12 | 2460 |
| 13 | 2465 |
| 14 | 2470 |
| 15 | 2475 |
| 16 | 2480 |

SYSTEM AND METHOD FOR REAL-TIME LOCATING

TECHNICAL FIELD

This disclosure relates to a system and a method for real-time locating.

BACKGROUND

Radio-frequency (RF) ranging technology provides information regarding distance and relative position between objects. An RF ranging system calculates the distance between two objects based on the time a radio signal propagates between the two objects and the speed of the radio signal. In air, the radio signal propagates at a constant rate, roughly equal to the speed of light.

Traditionally, the RF ranging system utilizes highly accurate, synchronized clocks to calculate the propagation time. For example, in such a system, a first radio device and a second radio device both contain clocks synchronized such that the second radio device receives a signal from the first radio device and compares a signal departure time to a signal arrival time to calculate the propagation time. The system multiplies this propagation time by the speed of light to estimate a distance between the first and second radio devices. Maintaining a system of clocks synchronized to the level of accuracy required to make this type of system practicable for ranging purposes represents a significant drawback.

Early approaches to RF ranging systems were primarily dominated by continuous wave (CW) and other narrow bandwidth systems. While CW systems, such as tellurometers, enable long distance ranging in the tens of kilometers and accuracies of 1 cm at a distance of 1 km in low multipath environments, these systems often suffer from poor multipath performance and susceptibility to jamming, and tend to cause interference to other communications systems. In recent years, CW systems have mostly been superseded by ultra-wideband (UWB) and various spread spectrum systems.

UWB systems in the U.S. are constrained to operate within Federal Communications Commission (FCC) regulations. Thus, their range is typically limited to a few hundred meters using directional antennas in low multipath environments, and typically much less than 100 meters indoors with omni-directional antennas. UWB systems also require complex RF electronics which can drive up system cost and raise regulatory issues.

RF ranging technology may also be used to implement a real-time locating system. For example, a first radio device in the real-time locating system may be attached to an object, such as a vehicle, for which a location is to be determined. Other radio devices in the real-time locating system may each use the RF ranging technology to calculate a distance from the first radio device. The location of the object may then be determined based on the calculated distances and the locations of those other radio devices.

An example of such real-time locating system is a global positioning system (GPS), which provides an absolute location for an object. In many situations, however, GPS signals may be either unavailable or actively denied to a potential user. Thus, there is a need for real-time locating systems and methods to address the issues described above.

SUMMARY

Consistent with the invention, there is provided a locating system, comprising at least one initiator configured to operate at a first clock frequency, and to transmit a measurement signal including a first preamble; and at least one transponder configured to operate at a second clock frequency; wherein the transponder includes a first transceiver configured to receive the measurement signal and to perform synchronization with the first preamble; a first programmable device configured to detect a first plurality of skips during the performance of synchronization, and to count a first plurality of numbers of clock cycles for the first plurality of skips; and the first transceiver configured to transmit a response signal to the initiator, the response signal including a second preamble and a data payload including the first plurality of numbers of clock cycles; and wherein the initiator includes a second transceiver configured to receive the response signal and to perform synchronization with the second preamble; a second programmable device configured to detect a second plurality of skips during the performance of synchronization, and to count a second plurality of numbers of clock cycles for the second plurality of skips; and a microcontroller configured to calculate a first time adjustment based on the first plurality of numbers of clock cycles, to calculate a second time adjustment based on the second plurality of numbers of clock cycles, and to calculate, based on a coarse time estimate, the first time adjustment, and the second time adjustment, a distance between the initiator and the transponder for determining a location of the transponder.

Also consistent with the invention, there is provided a locating method, comprising transmitting, by a first radio device operating at a first clock frequency, a measurement signal including a first preamble; receiving, by a second radio device operating at a second clock frequency, the measurement signal; performing, by the second radio device, synchronization with the first preamble; detecting, by the second radio device, a first plurality of skips during the performance of synchronization, and counting a first plurality of numbers of clock cycles for the first plurality of skips; transmitting, by the second radio device, a response signal to the first radio device, the response signal including a second preamble and a data payload including the first plurality of numbers of clock cycles; receiving, by the first radio device, the response signal; performing, by the first radio device, synchronization with the second preamble; detecting, by the first radio device, a second plurality of skips during the performance of synchronization, and counting a second plurality of numbers of clock cycles for the second plurality of skips; calculating, by the first radio device, a first time adjustment based on the first plurality of numbers of clock cycles, and a second time adjustment based on the second plurality of numbers of clock cycles; and calculating by the first radio device, based on a coarse time estimate, the first time adjustment, and the second time adjustment, a distance between the first and second radio devices for determining a location of the second radio device.

Further, and consistent with the invention, there is provided a computer-readable storage medium including instructions, executable by a processor, for instructing first and second radio devices to perform a locating method, the first radio device being configured to operate at a first clock frequency, the second radio device being configured to operate at a second clock frequency, the method comprising transmitting, by the first radio device, a measurement signal including a first preamble; receiving, by the second radio device, the measurement signal; performing, by the second radio device, synchronization with the first preamble; detecting, by the second radio device, a first plurality of skips during the performance of synchronization, and counting a first plurality of numbers of clock cycles for the first plurality of skips; transmitting, by the second radio device, a response signal to the first radio device, the response signal including a second preamble and a data payload including the first plurality of numbers of clock cycles; receiving, by the first radio device, the response signal; performing, by the first radio device, synchronization with the second preamble; detecting, by the first radio device, a second plurality of skips during the performance of synchronization, and counting a second plurality of numbers of clock cycles for the second plurality of skips; calculating, by the first radio device, a first time adjustment based on the first plurality of numbers of clock cycles, and a second time adjustment based on the second plurality of numbers of clock cycles; and calculating by the first radio device, based on a coarse time estimate, the first time adjustment, and the second time adjustment, a distance between the first and second radio devices for determining a location of the second radio device.

Further, and consistent with the invention, there is provided a first radio device configured to operate at a first clock frequency for use in a locating system, comprising a transceiver configured to transmit to a second radio device a measurement signal including a first preamble, to receive from the second radio device a response signal including a second preamble of the PN codes corresponding to a second clock frequency, and to perform synchronization with the second preamble; a programmable device configured to detect a plurality of skips during the performance of synchronization, and to count a plurality of numbers of clock cycles for the plurality of skips; and a microcontroller configured to calculate a time adjustment based on the plurality of numbers of clock cycles, and to calculate, based on a coarse time estimate and the time adjustment, a distance between the first radio device and the second radio device for determining a location of the second radio device.

Also consistent with the invention, there is provided a first radio device configured to operate at a first clock frequency for use in a locating system, comprising a transceiver configured to receive from a second radio device a measurement signal including a first preamble and to perform synchronization with the first preamble; a programmable device configured to detect a plurality of skips during the performance of synchronization, and to count a plurality of numbers of clock cycles for the plurality of skips; wherein transceiver is configured to transmit to the second radio device a response signal, the response signal including a second preamble and a data payload including the plurality of numbers of clock cycles.

Also consistent with the invention, there is provided a locating method for use by a first radio device in a locating system, the first radio device being configured to operate at a first clock frequency, the method comprising transmitting to a second radio device a measurement signal including a first preamble; receiving from the second radio device a response signal including a second preamble; performing synchronization with the second preamble; detecting a plurality of skips during the performance of synchronization; counting a plurality of numbers of clock cycles for the plurality of skips; calculating a time adjustment based on the plurality of numbers of clock cycles; counting a number of clock cycles between the transmission of the measurement signal and the reception of the response signal; calculating a coarse time estimate based on the number of clock cycles; and calculating, based on the coarse time estimate and the time adjustment, a distance between the first radio device and the second radio device for determining a location of the second radio device.

Also consistent with the invention, there is provided a locating method for use by a first radio device in a locating system, the first radio device being configured to operate at a first clock frequency, the method comprising receiving from a second radio device a measurement signal including a first preamble; performing synchronization with the first preamble; detecting a plurality of skips during the performance of synchronization; counting a plurality of numbers of clock cycles for the plurality of skips; counting a number of clock cycles between the reception of the measurement signal and transmission of a response signal; and transmitting to the second radio device the response signal, the response signal including a second preamble and a data payload including the plurality of numbers of clock cycles and the number of clock cycles, for the second radio device to determine a distance between the first radio device and the second device.

Also consistent with the invention, there is provided a computer-readable storage medium including instructions, executable by a processor, for instructing a first radio device to perform a locating method, the first radio device being configured to operate at a first clock frequency, the method comprising transmitting to a second radio device a measurement signal including a first preamble; receiving from the second radio device a response signal including a second preamble; performing synchronization with the second preamble; detecting a plurality of skips during the performance of synchronization; counting a plurality of numbers of clock cycles for the plurality of skips; calculating a time adjustment based on the plurality of numbers of clock cycles; counting a number of clock cycles between the transmission of the measurement signal and the reception of the response signal; calculating a coarse time estimate based on the number of clock cycles; and calculating, based on the coarse time estimate and the time adjustment, a distance between the first radio device and the second radio device for determining a location of the second radio device.

Also consistent with the invention, there is provided a computer-readable storage medium including instructions, executable by a processor, for instructing a first radio device to perform a locating method, the first radio device being configured to operate at a first clock frequency, the method comprising receiving from a second radio device a measurement signal including a first preamble; performing synchronization with the first preamble; detecting a plurality of skips during the performance of synchronization; counting a plurality of numbers of clock cycles for the plurality of skips; counting a number of clock cycles between the reception of the measurement signal and transmission of a response signal; and transmitting to the second radio device the response signal, the response signal including a second preamble and a data payload including the plurality of numbers of clock cycles and the number of clock cycles, for the second radio device to determine a distance between the first radio device and the second device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Figure 1:
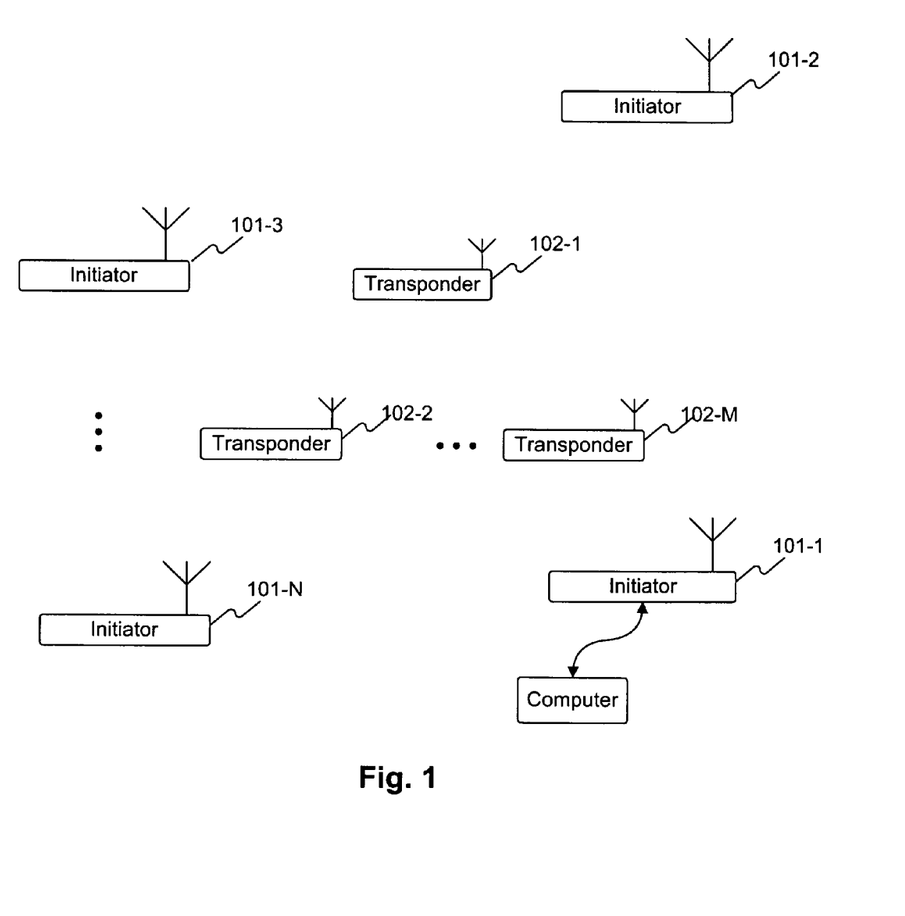
FIG. 1 is a block diagram of a real-time locating system, according to an exemplary embodiment.

FIG. 1 is a block diagram of a real-time locating system 100, according to an exemplary embodiment. The system 100 may include a plurality of measurement initiating devices, referred to hereafter as initiators, 101-1, 101-2, ..., 101-N, and a plurality of transponders 102-1, 102-2, ... 102-M. The initiators 101-1, 101-2, ..., 101-N may be deployed within, or surround, an area to be monitored, and may be placed at a fixed location or be mobile. The transponder 102-$i$ ($i=1$, 2, ... M) may be attached to an object in the area whose location is to be determined.

In exemplary embodiments, each of the initiators 101-1, 101-2, ..., 101-N is a radio device configured to initiate a measurement of a distance between the initiator and the transponder 102-$i$, in consistence with the method described below, thereby to obtain measurement data. The initiators 101-1, 101-2, ..., 101-N may then each calculate a distance between itself and the transponder 102-$i$ as distance data. A location of the transponder 102-$i$ and, hence, the location of the object, may be further determined based on the calculated distances between the initiators 101-1, 101-2, ..., 101-N and the transponder 102-$i$.

In one exemplary embodiment, one of the initiators 101-1, 101-2, ..., 101-N, e.g., the initiator 101-1, is configured to operate as a primary initiator for controlling the system 100 and for collecting distance data from remaining ones of the initiators 101-1, 101-2, ..., 101-N. The primary initiator may further provide the collected distance data and its own distance data to a computer for further processing. The computer then determines the location of the transponder 102-$i$ based on the distance data received from the primary initiator.

In exemplary embodiments, the system 100 may operate in multiple modes, such as first, second, and third modes. In the first mode, referred to herein as an "ad-hoc mode," the system 100 performs distance measurements upon receiving a request from a transponder, such as the transponder 102-$i$. For example, in the ad-hoc mode, the transponder 102-$i$ may be in a sleep state most of the time to save power and may wake up periodically to perform measurements. When the transponder 102-$i$ wakes up, the transponder 102-$i$ may transmit a beacon signal, also known as a "presence chirp," to request a distance measurement. The ad-hoc mode will allow the system 100 to include a large number of transponders when continuous real-time tracking is not required for all transponders.

In one exemplary embodiment, the transponder 102-$i$ may include a motion sensor configured to wake up the transponder 102-$i$ when the transponder 102-$i$ starts to move. The transponder 102-$i$ may then request a distance measurement and provide tracking information while in motion.

In the second mode, referred to herein as a "static continuous mode," the system 100 sequentially performs distance measurements to all transponders in the system 100. A sequence of the measurements to the transponders may be pre-set, and the sequence may be unchanged during operation.

In the third mode, referred to herein as a "dynamic continuous mode," the system 100 continuously tracks a changing group of transponders. In addition, at least one of the initiators 101-1, 101-2, ..., 101-N may be attached to a mobile object in the area, and remaining ones of the initiators 101-1, 101-2, ..., 101-N are placed at fixed locations. The remaining ones of the initiators 101-1, 101-2, ..., 101-N may perform distance measurements to the at least one of the initiators 101-1, 101-2, ..., 101-N and the transponder 102-$i$. In this manner, the at least one of the initiators 101-1, 101-2, ..., 101-N also operates as a transponder. To provide flexibility, a sequence of the measurements to the at least one of the initiators 101-1, 101-2, ..., 101-N and the transponder 102-$i$ may be dynamic. In other words, the sequence of the measurements may be changed during operation.

In exemplary embodiments, the initiators 101-1, 101-2, ..., 101-N and the transponder 102-$i$ may communicate based on a communication standard, e.g., the ZigBee standard. The ZigBee standard is a specification for high-level communication protocols using small, low-power digital radios based on the IEEE 802.15.4 standard for wireless personal area networks. Additionally, operation of the system 100 may comply with FCC regulations.

In addition, the initiators 101-1, 101-2, ..., 101-N and the transponder 102-$i$ may be configured to communicate based on a direct-sequence spread spectrum (DSSS) technique. For example, based on the DSSS technique, a transmitter may multiply a baseband signal by a plurality of pseudonoise (PN) codes each being a sequence of "1" and "−1" values. Each value in a PN code is also referred to as a chip. Because the PN code is typically at a higher frequency than the baseband signal, the PN code may spread the baseband signal to a wider band. The resulting baseband PN-coded signal is modulated to an RF carrier frequency and transmitted to a receiver. At the receiver, after demodulation to baseband, a correlator multiplies the baseband PN-coded signal by the same PN codes to reconstruct the original baseband signal. By applying the DSSS technique to the system 100, relatively high precision may be achieved for performing distance measurements.

Figure 2:
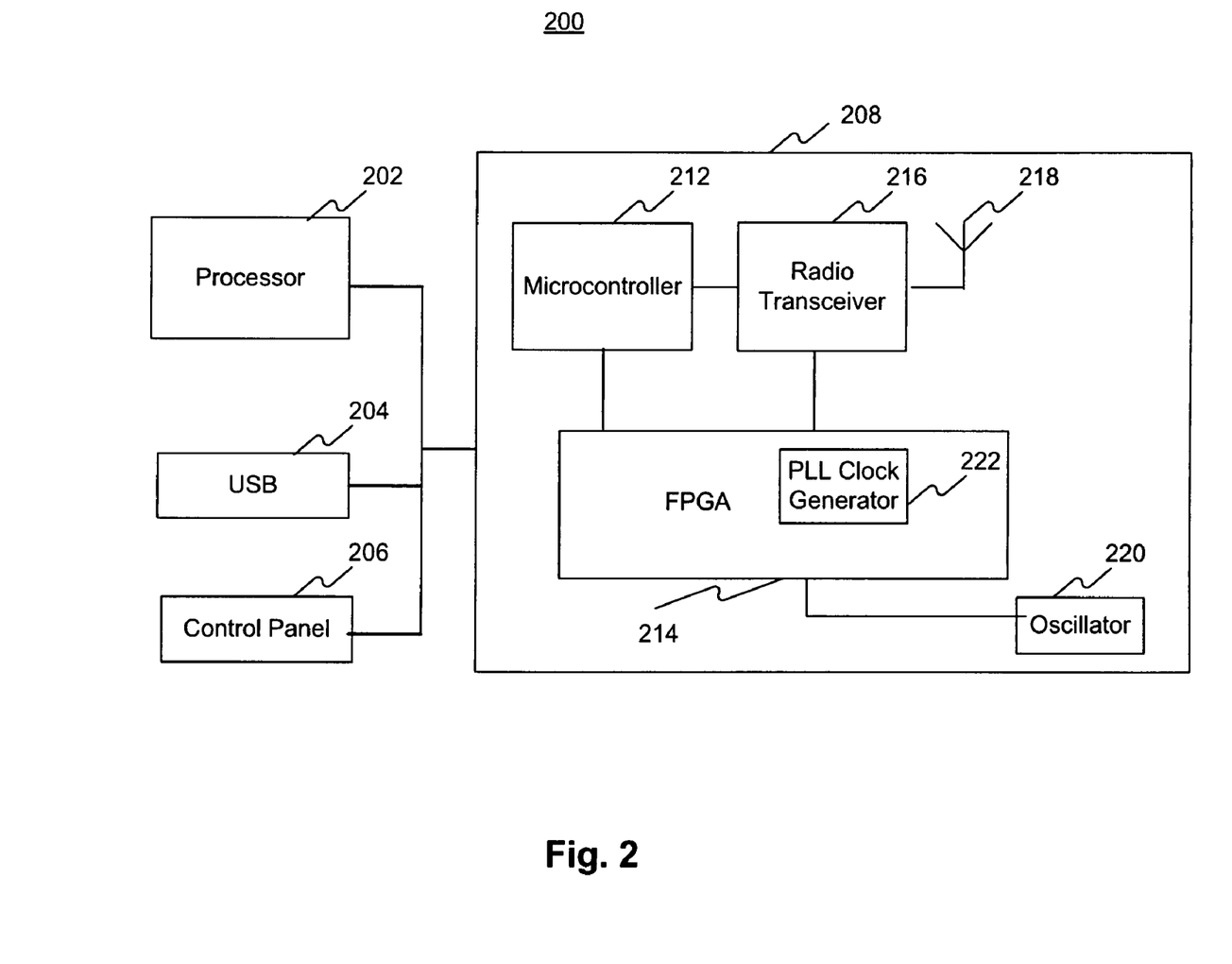
FIG. 2 is a block diagram of an initiator, according to an exemplary embodiment.

FIG. 2 is a block diagram of an initiator 200, according to an exemplary embodiment. For example, the initiator 200 may be any of the initiators 101-1, 101-2, ..., 101-N (FIG. 1), and may receive operating power from a battery. The initiator 200 may include a processor 202, a digital interface such as a universal serial bus (USB) interface 204, a control panel 206, and a radio measurement unit (RMU) 208.

In exemplary embodiments, the processor 202 is configured to plan a distance measurement, to control the RMU 208 to transmit a measurement signal to a transponder. If the initiator 200 does not operate as a primary initiator, the processor 202 is configured to relay distance data to a primary initiator. If the initiator 200 operates as a primary initiator, the processor 202 is configured to collect distance data from other initiators, and to provide its own distance data and the collected distance data to a computer for further processing.

In exemplary embodiments, the USB interface 204 provides an interface for configuring the initiator 200. When the initiator 200 operates as a primary initiator, the USB interface 204 further provides an interface between the initiator 200 and the computer for outputting distance and other data to the computer. Additionally, the USB interface 204 may provide an interface for charging the battery which provides operating power for the initiator 200.

In exemplary embodiments, the control panel 206 provides a control interface for a user. For example, the user may turn on or turn off the initiator 200 through the control panel 206. Also for example, the control panel 206 may include light-emitting diodes (LEDs) showing an operation status of the initiator 200.

In exemplary embodiments, the RMU 208 is configured to generate the measurement signal and transmit the generated measurement signal to the transponder. The RMU 208 is further configured to receive the response signal from the transponder and process the received response signal. The RMU 208 may include a microcontroller 212, a programmable device such as a field-programmable gate array (FPGA) 214, a radio transceiver 216, and an antenna 218. The RMU 208 may additionally include an oscillator 220, e.g., a temperature compensated crystal oscillator (TCXO), for providing a reference clock signal.

More particularly, in exemplary embodiments, the microcontroller 212 may be coupled to the processor 202 via, e.g., a serial peripheral interface (SPI). The microcontroller 212 is configured to receive control signals from the processor 202, to further control the radio transceiver 216 and the FPGA 214. Additionally, the microcontroller 212 may be configured to generate distance data based on skip counts outputted from the FPGA 214, which will be described below. Alternatively, the FPGA 214 may generate the distance data based on the skip counts.

In one exemplary embodiment, the initiator may initiate a distance measurement to a transponder, or operate as a transponder. The microcontroller 212 is configured to set a master clock frequency offset by sending a frequency selection signal to the FPGA 214, such that the FPGA 214 may generate a first master clock frequency or a second master clock frequency, depending on whether the initiator initiates a distance measurement to a transponder, or operates as a transponder.

In exemplary embodiments, the FPGA 214 is configured to generate a master clock frequency for the transceiver 216. For example, the FPGA 214 may include a phase-locked loop (PLL) clock generator 222, operating as a master clock, for generating the master clock frequency based on the frequency selection signal received from the microcontroller 212 and the reference clock signal provided by the oscillator 220. In addition, the FPGA 214 is also configured to detect a plurality of skips during performance of synchronization by the radio transceiver 216, and to count a plurality of numbers of clock cycles for the first plurality of skips, i.e., skip counts, which will be described below.

In exemplary embodiments, the radio transceiver 216 is configured to transmit and receive data based on the DSSS technique. For example, when transmitting the measurement signal to the transponder, the radio transceiver 216 may generate a baseband PN-coded signal using PN codes corresponding to the master clock frequency, and convert the baseband PN-coded signal to an RF signal corresponding to the measurement signal. Also for example, when receiving the response signal from the transponder, the radio transceiver 216 may convert an RF signal corresponding to the response signal to a baseband PN-coded signal.

Figure 3:
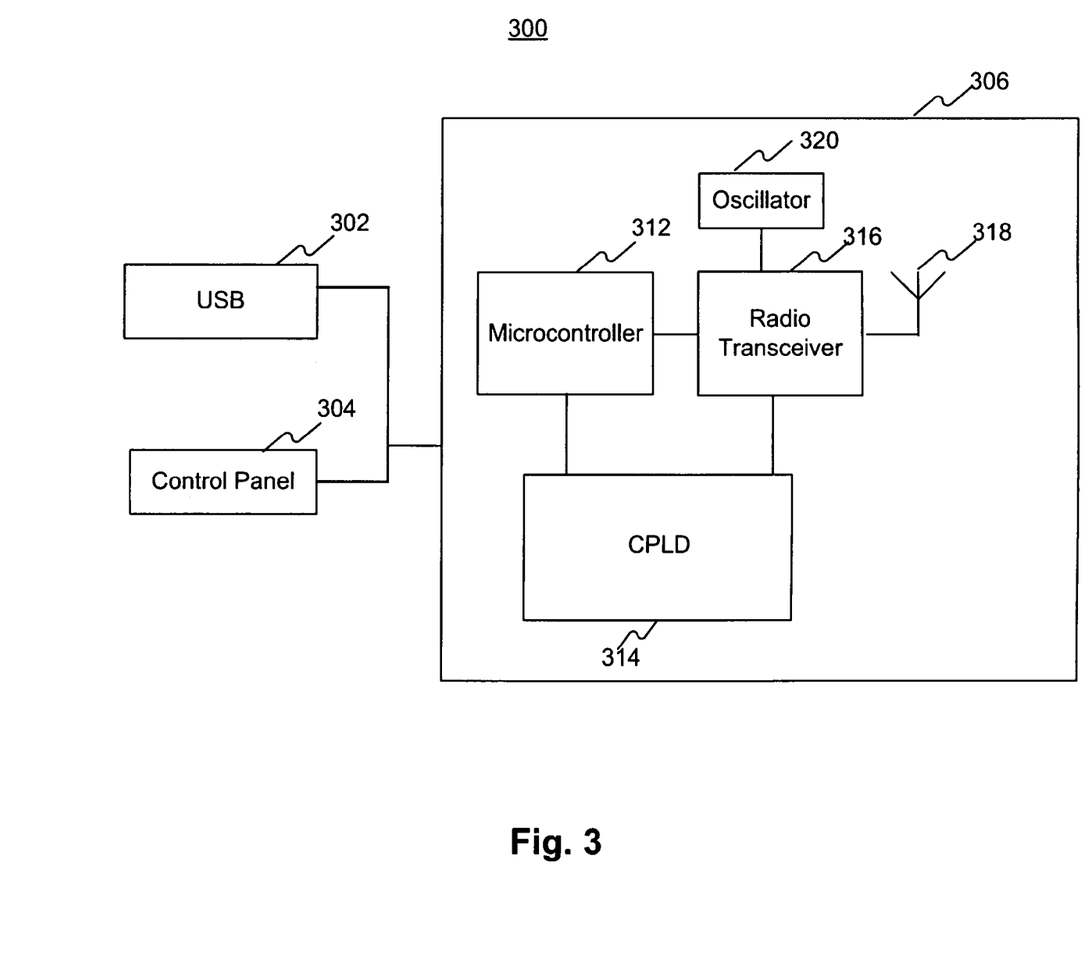
FIG. 3 is a block diagram of a transponder, according to an exemplary embodiment.

FIG. 3 is a block diagram of a transponder 300, according to an exemplary embodiment. For example, the transponder 300 may be any of the transponders 102-1, 102-2, . . . 102-M (FIG. 1), and may receive operating power from a battery. The transponder 300 may include a digital interface such as a USB interface 302, a control panel 304, and an RMU 306.

In exemplary embodiments, the USB interface 302 provides an interface for configuring the transponder 300. Additionally, the USB interface 302 may provide an interface for charging the battery which provides operating power for the transponder 300.

In exemplary embodiments, the control panel 304 provides a control interface for a user. For example, the user may turn on or turn off the transponder 300 through the control panel 304. Also for example, the control panel 304 may include LEDs showing an operation status of the transponder 300.

In exemplary embodiments, the RMU 306 may be configured to receive the measurement signal from the initiator and process the received measurement signal. The RMU 306 may be further configured to generate the response signal and transmit the generated response signal to the initiator. The RMU 306 may include a microcontroller 312, a programmable device such as a complex programmable logic device (CPLD) 314, a radio transceiver 316, and an antenna 318. The RMU 306 may additionally include an oscillator 320, e.g., a TCXO, for operating as a master clock to provide a master clock frequency. The transponder 300 may operate at a predetermined, fixed master clock frequency. Therefore the oscillator 320 may be directly connected to the radio transceiver 316 to provide the master clock frequency.

More particularly, in exemplary embodiments, the microcontroller 312 may be configured to control the radio transceiver 316 to receive the measurement signal from the initiator and to transmit the response signal to the initiator.

In exemplary embodiments, the CPLD 314 may be configured to detect a plurality of skips during performance of synchronization by the radio transceiver 316, and to count a plurality of numbers of clock cycles for the plurality of skips, i.e., skip counts, which will be described below. In addition, the CPLD 314 may include a built-in non-volatile memory that loads data relatively quickly on start-up. This makes it suitable for the transponder 300 to be in a sleep state between measurements to save power. Compared to the FPGA 214 (FIG. 2), the CPLD 314 is generally smaller, of lower cost, and of lower power consumption.

In exemplary embodiments, the radio transceiver 316 may be configured to transmit and receive data based on the DSSS technique. For example, when receiving the measurement signal from an initiator, the radio transceiver 316 may convert an RF signal corresponding to the measurement signal to a baseband PN-coded signal. Also for example, when transmitting the response signal to the initiator, the radio transceiver 316 may generate a baseband PN-coded signal based on the PN codes corresponding to the master clock frequency, and convert the baseband PN-coded signal to an RF signal corresponding to the response signal.

Figure 4:
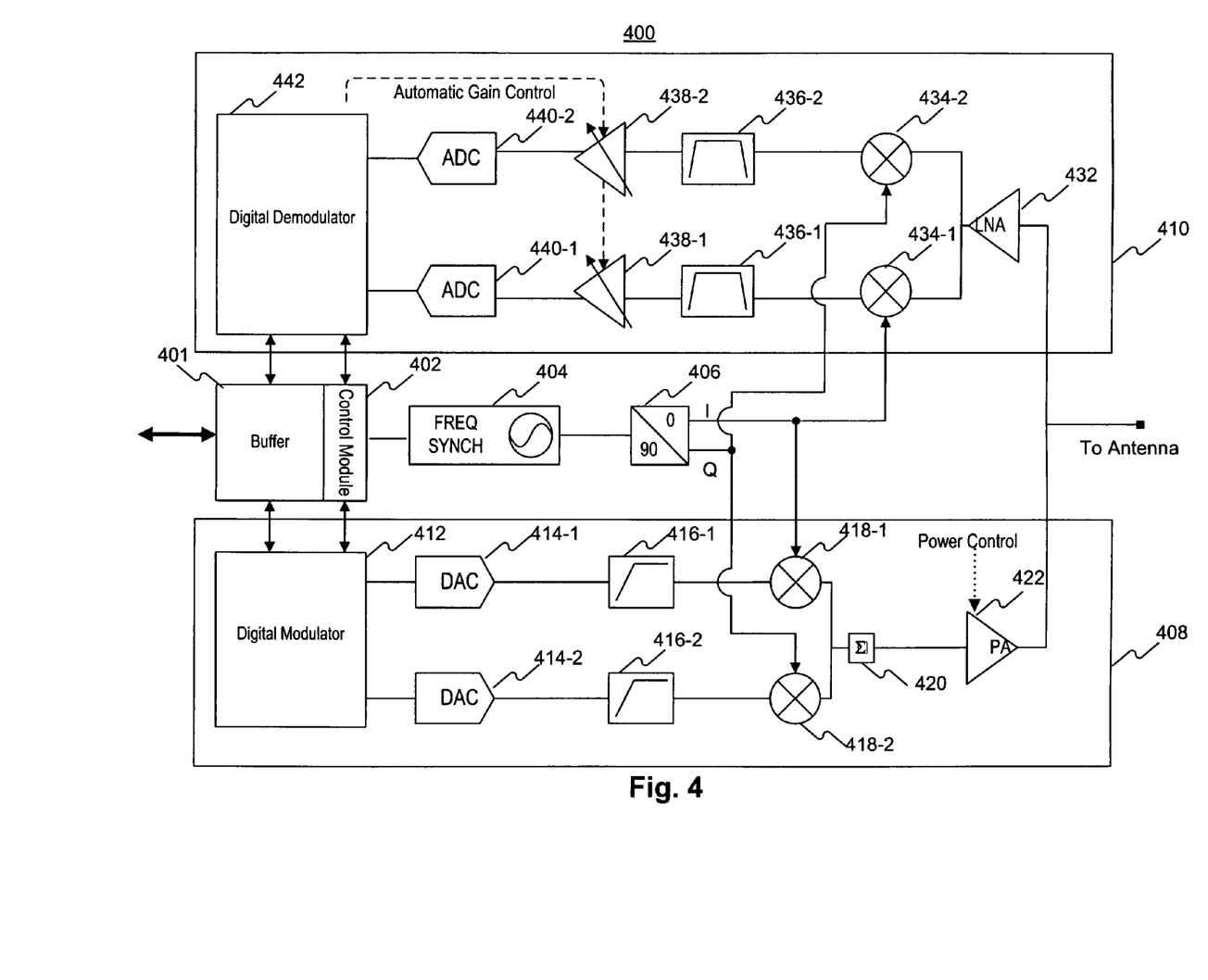
FIG. 4 is a block diagram of a transceiver, according to an exemplary embodiment.

FIG. 4 is a block diagram of a radio transceiver 400, according to an exemplary embodiment. For example, the radio transceiver 400 may be the radio transceiver 216 (FIG. 2) or the radio transceiver 316 (FIG. 3). The radio transceiver 400 may be configured to transmit and receive data based on the DSSS technique. The radio transceiver 400 may include a buffer 401, a control module 402, a frequency synthesizer 404, a phase splitter 406, a transmitter 408, and a receiver 410.

In exemplary embodiments, the buffer 401 may be configured to temporarily store received data or data to be transmitted. The control module 402 may be configured to control operation of the transmitter 408 and the receiver 410. The frequency synthesizer 404 may be configured to provide a carrier signal at a radio frequency for the phase splitter 406 to generate an in-phase (I) component of the carrier signal and a quadrature (Q) component of the carrier signal.

In exemplary embodiments, the transmitter 408 may further include a digital modulator 412, first and second digital-to-analog converters (DACs) 414-1 and 414-2, first and second low-pass filters 416-1 and 416-2, first and second mixers 418-1 and 418-2, a summation device 420, and a power amplifier (PA) 422.

In exemplary embodiments, when the radio transceiver 400 transmits a signal, such as a measurement signal or a response signal, the digital modulator 412 generates a baseband PN-coded signal based on PN codes corresponding to a master clock frequency, such as the master clock frequency provided by the PLL clock generator 222 (FIG. 2) or by the oscillator 320 (FIG. 3).

In exemplary embodiments, the baseband PN-coded signal is a digital quaduature signal including an I component and a Q component, which are passed through the DACs 414-1 and 414-2, respectively, to be converted to an analog quaduature signal. The I component and the Q component of the analog quadrature signal are passed through the low-pass filters 416-1 and 416-2, respectively, to filter out noise, and are then, up-converted to the radio frequency by being passed through the mixers 418-1 and 418-2, respectively. The summation device 420 sums the outputs of the mixers 418-1 and 418-2 to generate an RF signal, which is further amplified by the power amplifier 422 before transmission.

For example, if the transceiver 400 is used in an initiator, such as the initiator 200 (FIG. 2), the amplified RF signal is the measurement signal sent from the initiator. Also for example, if the transceiver 400 is used in a transponder, such as the transponder 300 (FIG. 3), the amplified RF signal is the response signal sent from the transponder.

In exemplary embodiments, the receiver 410 may include a low-noise amplifier (LNA) 432, first and second mixers 434-1 and 434-2, first and second band-pass filters 436-1 and 436-2, first and second intermediate frequency (IF) amplifiers 438-1 and 438-2 with automatic gain control, first and second analog-to-digital convertors (ADCs) 440-1 and 440-2, and a digital demodulator 442.

In exemplary embodiments, when the radio transceiver 400 receives a signal, such as a measurement signal or a response signal, the LNA 432 amplifies the received signal to generate an RF signal, which is passed through the mixers 434-1 and 434-2 to be down-converted in quadrature to an intermediate frequency, to generate an IF signal. An I component of the IF signal and a Q component of the IF signal are passed through the band-pass filters 436-1 and 436-2, respectively, to filter out noise, and are further amplified by the IF amplifiers 438-1 and 438-2, respectively, before being converted to a digital quadrature signal by the ADCs 440-1 and 440-2. The demodulator 442 then performs de-spreading and synchronization on the quadrature signal.

In one exemplary embodiment, the radio transceiver 400 is implemented using a CC2420 chip by Texas Instruments. The CC2420 chip has a special unbuffered serial mode, which may provide direct data and data clock connections on its FIFO and FIFOP pins. In addition, the CC2420 chip provides a DEMOD_RESYNC_LATE signal and a DEMOD_R-ESYNC_EARLY signal. If its master clock and a clock corresponding to received data are offset positively by a predetermined fraction of one clock cycle, the CC2420 chip may generate, e.g., the DEMOD_RESYNC_EARLY signal. If its master clock and the clock corresponding to received data are offset negatively by a predetermined fraction of one clock cycle, the CC2420 chip may generate, e.g., the DEMOD_R-ESYNC_LATE signal.

In one exemplary embodiment, one of the DEMOD_R-ESYNC_EARLY signal and the DEMOD_RESYNC_LATE signal provided by the CC2420 chip may be used as a skip signal indicating an occurrence of a skip. For example, the DEMOD_RESYNC_EARLY signal may be assigned to an SFD pin of the CC2420 chip for use as the skip signal. When the master clock is not synchronized with received data by a predetermined fraction of one clock cycle, the CC2420 chip may resynchronize its clock in order to maintain lock with the received data. As a result, a skip may occur, and the skip signal indicating the occurrence of the skip may be generated.

In another exemplary embodiment, the occurrence of a skip may be detected by monitoring the number of master clock cycles in each data cycle. A data cycle, also known as a data clock, is the clock rate for data out of the baseband processor. The data cycle is generally equal to a chip rate, i.e., the master clock rate, divided by the number of chips per bit. For example, for the CC2420 chip, there are 32 chips per bit. By detecting a change of the number of master clock cycles in a data cycle, the FPGA of the initiator or the CPLD of the transponder may detect the occurrence of a skip, and record the master clock count as the count of the skip signal.

Figure 5:
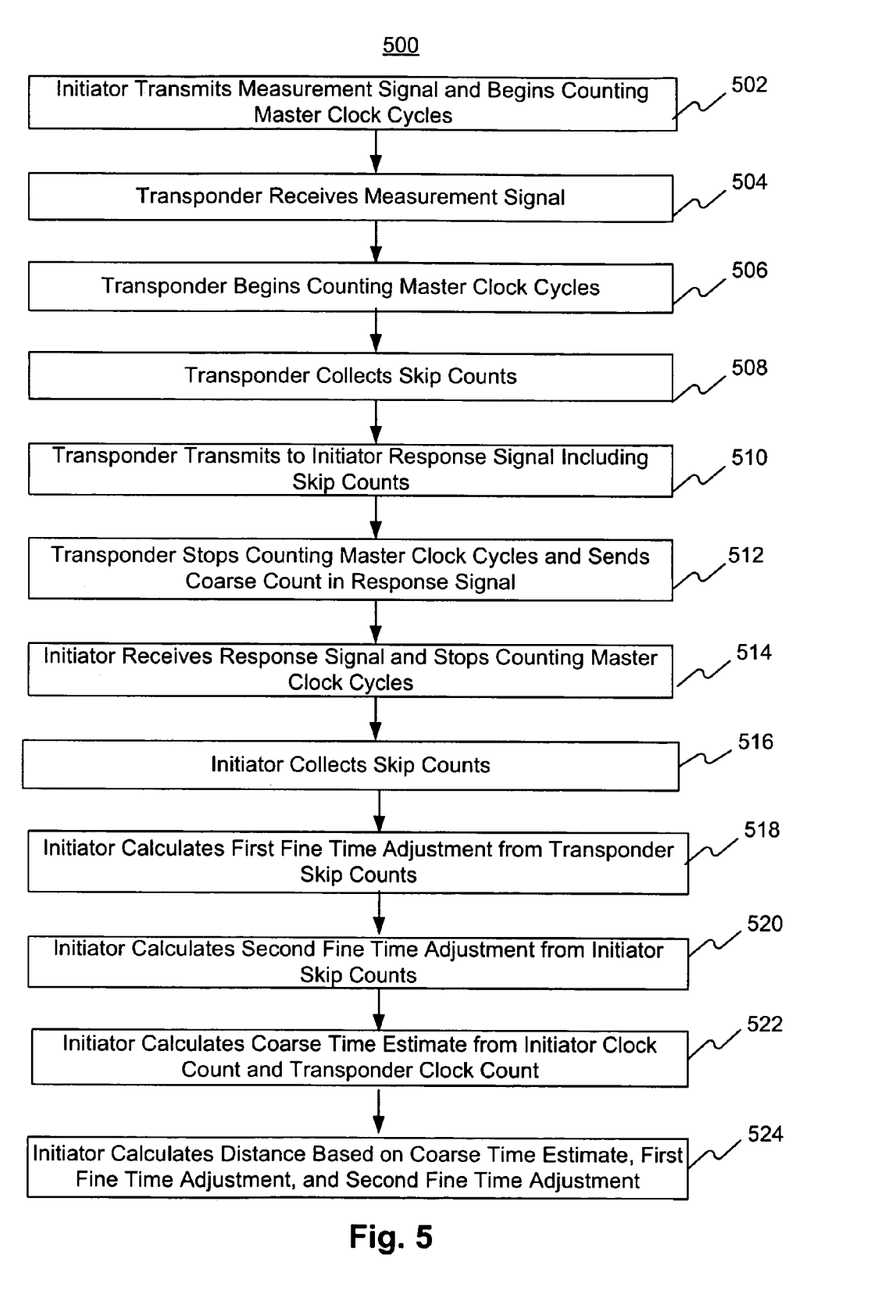
FIG. 5 illustrates a method for an initiator to perform a distance measurement to a transponder, according to an exemplary embodiment.

FIG. 5 illustrates a method 500 for an initiator to perform a distance measurement to a transponder, according to an exemplary embodiment. For example, the initiator may be any of the initiators 101-1, 101-2, . . . , 101-N (FIG. 1), and the transponder may be any of the transponders 102-1, 102-2, . . . 102-M (FIG. 1).

In exemplary embodiments, the initiator and the transponder operate at slightly offset master clock frequencies. For example, the initiator may operate at a master clock frequency $f_{initiator}$, and the transponder may operate at a master clock frequency $f_{transponder}$ slightly offset from the initiator's master clock frequency $f_{initiator}$. By offsetting the master clock frequencies of the initiator and the transponder, relative phasing between the initiator and the transponder may be utilized to estimate a fine time adjustment to a coarse estimate of signal propagation time between the initiator and the transponder.

In exemplary embodiments, the initiator begins the distance measurement by transmitting to the transponder a measurement signal including a first preamble of PN codes corresponding to the master clock frequency $f_{initiator}$ (502). For example, the initiator may generate the measurement signal similar to the above description in connection with FIG. 4. Once the initiator transmits the measurement signal, the initiator begins counting a number of master clock cycles of the initiator master clock, and waits for a response signal from the transponder (502).

On the transponder side, the transponder receives the measurement signal from the initiator (504). Once the transponder receives the measurement signal, the transponder begins counting a number of master clock cycles of the transponder master clock (506), and counts until the transponder transmits a response signal back to the initiator. The transponder also converts the received measurement signal to a baseband PN-coded signal including the preamble of the PN codes corresponding to the clock frequency $f_{initiator}$, also similar to the above description in connection with FIG. 4. The transponder further performs synchronization with the preamble of the PN codes in the measurement signal.

When the transponder performs the synchronization, the radio transceiver in the transponder attempts to lock onto the preamble of the PN codes. As long as the radio transceiver can decode the preamble and recognize a valid signal reception, the radio transceiver deems that it has locked onto the preamble. However, as described above, the initiator and the transponder operate at slightly offset master clock frequencies. Therefore, after a duration, the radio transceiver will need to resynchronize its clock in order to maintain lock with the received signal. Accordingly, the radio transceiver resynchronizes with the preamble of the PN codes by adjusting ahead or back a predetermined fraction of one master clock cycle, for example, one half master clock cycle. As a result, by monitoring a number of master clock cycles in each data cycle, the CPLD of transponder may detect the occurrence of a skip. As the above process repeats, the CPLD may detect a plurality of skips. The CPLD also counts master clock cycles to each skip, to collect skip counts (508).

After the transponder receives the measurement signal and finishes collecting skip counts, the transponder transmits a response signal to the initiator (510), and stops the counting of the number of master clock cycles (512). This number of master clock cycles counted between the transponder's reception of the measurement signal and the transmission of the response signal is referred to herein as a transponder coarse count $M_{count-transponder}$. Similar to the measurement signal, the response signal includes a preamble of the PN codes corresponding to the master clock frequency $f_{transponder}$. In addition, the transponder includes the transponder coarse count $M_{count-transponder}$ and the collected skip counts in a data payload of the response signal. As a result, when the transponder transmits the response signal to the initiator, the initiator obtains the transponder coarse count $M_{count-transponder}$ and the collected skip counts.

Back to the initiator side, the initiator receives the response signal from the transponder, and stops the counting of the number of master clock cycles (514). The initiator also converts the received response signal to a baseband PN-coded signal including the preamble of the PN codes corresponding to the clock frequency $f_{transponder}$, similar to the above description in connection with FIG. 4. The initiator further performs synchronization with the preamble of the PN codes in the response signal.

When the initiator performs the synchronization, the radio transceiver in the initiator attempts to lock onto the preamble of the PN codes. As long as the radio transceiver can decode the preamble and recognize a valid signal reception, the radio transceiver deems that it has locked onto the preamble. However, as described above, the initiator and the transponder operate at slightly offset master clock frequencies. Therefore, after a duration, the radio transceiver will need to resynchronize its clock in order to maintain lock with the received signal. Accordingly, the radio transceiver resynchronizes with the preamble of the PN codes by adjusting ahead or back a predetermined fraction of one master clock cycle, typically one half master clock cycle. As a result, by monitoring a number of master clock cycles in each data cycle, the FPGA of initiator may detect the occurrence of a skip. As the above process repeats, the FPGA may detect a plurality of skips. The FPGA also counts master clock cycles to each skip, to collect skip counts (516).

In exemplary embodiments, the microcontroller of the initiator may calculate a first fine time adjustment $t_{fine-transponder}$ based on the skip counts collected by the CPLD of the transponder (518), and calculate a second fine time adjustment $t_{fine-initiator}$ based on the skip counts collected by the FPGA of the initiator (520).

In addition, the microcontroller may use the number of initiator master clock cycles counted between the transmission of the measurement signal and the reception of the response signal, $M_{count-initiator}$, as well as the number of transponder master clock cycles counted between the transponder's reception of the measurement signal and the transmission of the response signal, $M_{count-transponder}$, to calculate a coarse estimate $t_{coarse}$ of signal propagation time between the initiator and the transponder (522), as follows:

$$t_{coarse} = \frac{M_{count-initiator}}{f_{initiator}} - \frac{M_{count-transponder}}{f_{transponder}}. \quad \text{equation (1)}$$

Based on the first fine time adjustment $t_{fine-transponder}$ (518), the second fine time adjustment $t_{fine-initiator}$ (520), and the coarse estimate $t_{coarse}$ of round-trip signal propagation time (522), the microcontroller may then calculate the one-way signal propagation time as follows:

$$t_{prop} = \frac{t_{coarse} - t_{fine-initiator} + t_{fine-transponder}}{2} - t_{system-delay}, \quad \text{equation (2)}$$

where $t_{system-delay}$ is a system delay time that may be predetermined during system calibration. The microcontroller may further calculate the distance between the initiator and the transponder (524), as follows:

$$d = c \cdot t_{prop}, \quad \text{equation (3)}$$

where d is the distance between the initiator and the transponder, and c is the speed of light.

In the above embodiments, the microcontroller of the initiator calculates the distance between the initiator and the transponder, based on clock count data provided by the FPGA of the initiator and the CPLD of the transponder. Alternatively, the FPGA may calculate the distance between the initiator and the transponder.

In exemplary embodiments, multiple distance measurements may be performed between the initiator and the transponder. A final distance estimate may then be determined based on an average of the multiple distance measurements. In addition, the initiator and the transponder may each execute instructions stored in computer-readable media to perform the steps discussed above and illustrated in FIG. 5.

Figure 6:
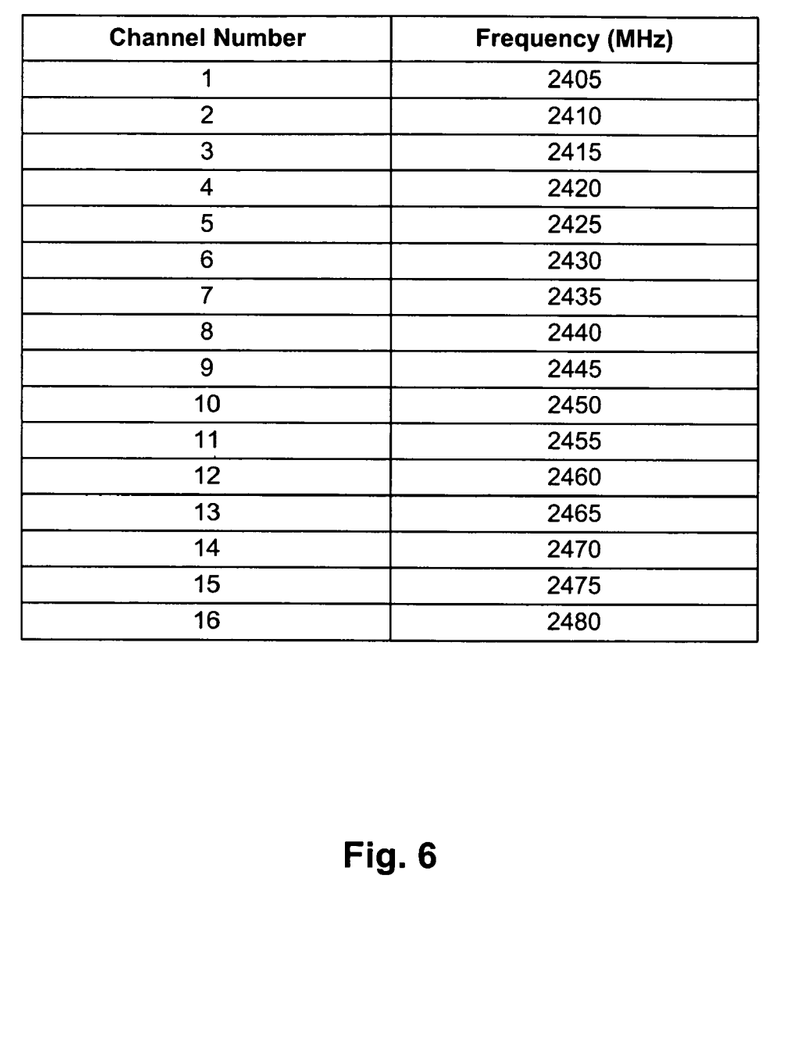
FIG. 6 is a table showing operational channel frequencies for a real-time locating system, according to an exemplary embodiment.

FIG. 6 is a table 600 showing operational channel frequencies for the system 100 (FIG. 1), according to an exemplary embodiment. Referring to FIG. 1 and FIG. 6, the system 100 may operate on one of sixteen RF frequencies. A selection of channel frequency may depend on interference conditions in the area where the system 100 is deployed. For example, if there are WiFi signals in the area, channel 5, 10, 15, or 16 may be selected, because they fall in between WiFi channels. For better performance, channel 16 may be selected because it is the furthest from WiFi channels.

In exemplary embodiments, there may also be provided a computer-readable storage medium including instructions, executable by a processor of a computer, for instructing the system 100 (FIG. 1) to perform the above-described methods. In addition, when executing the instructions, a graphic user interface (GUI) may be displayed on the computer. A user may perform configuration or settings for the system 100 through the GUI. The user may also view locating information on the computer. Additionally, when executing the instructions, a database including location information of all transponders may be established on the computer.

Figure 7:
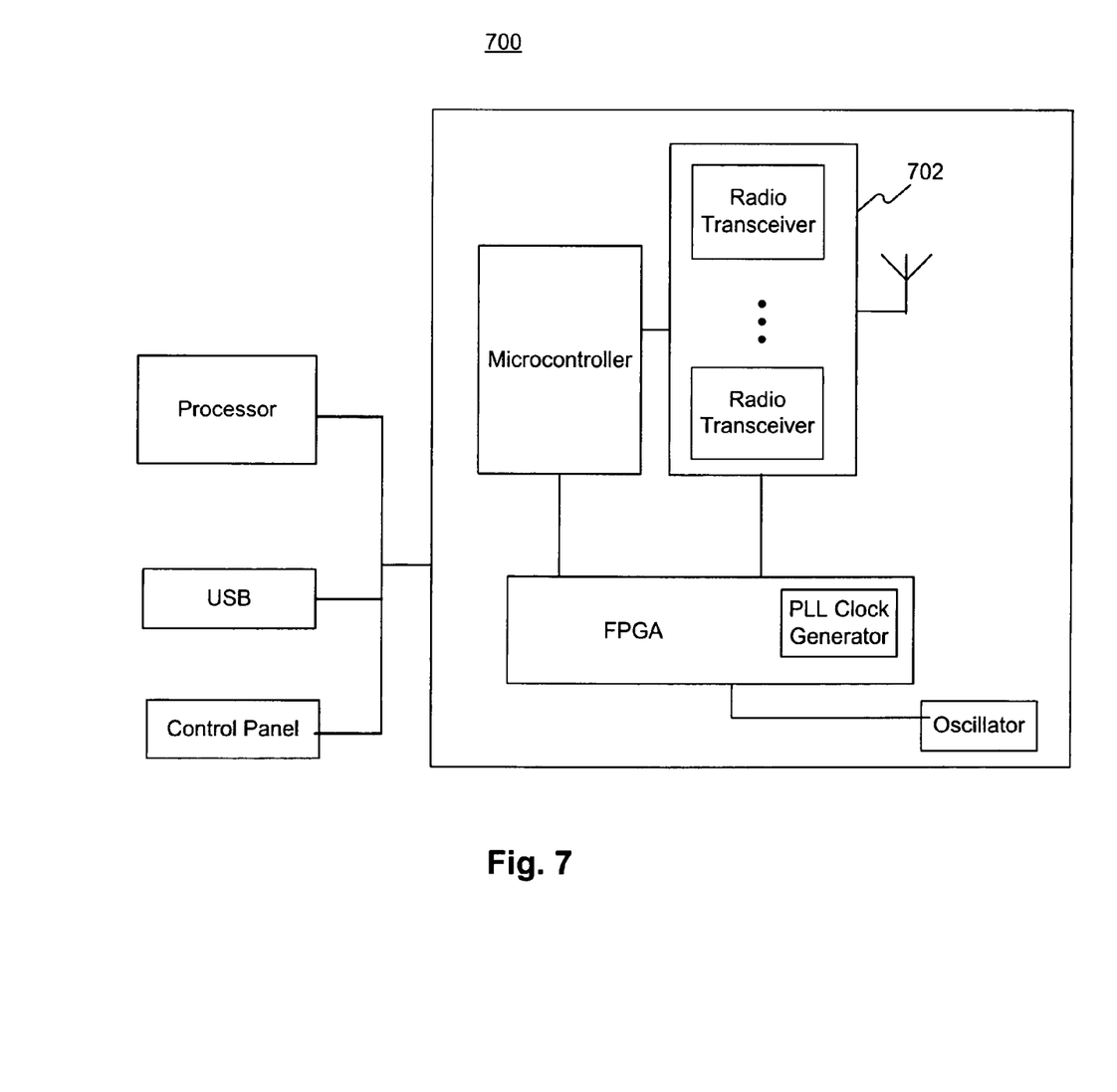
FIG. 7 is a block diagram of an initiator including a plurality of radio transceivers, according to an exemplary embodiment.
Figure 8:
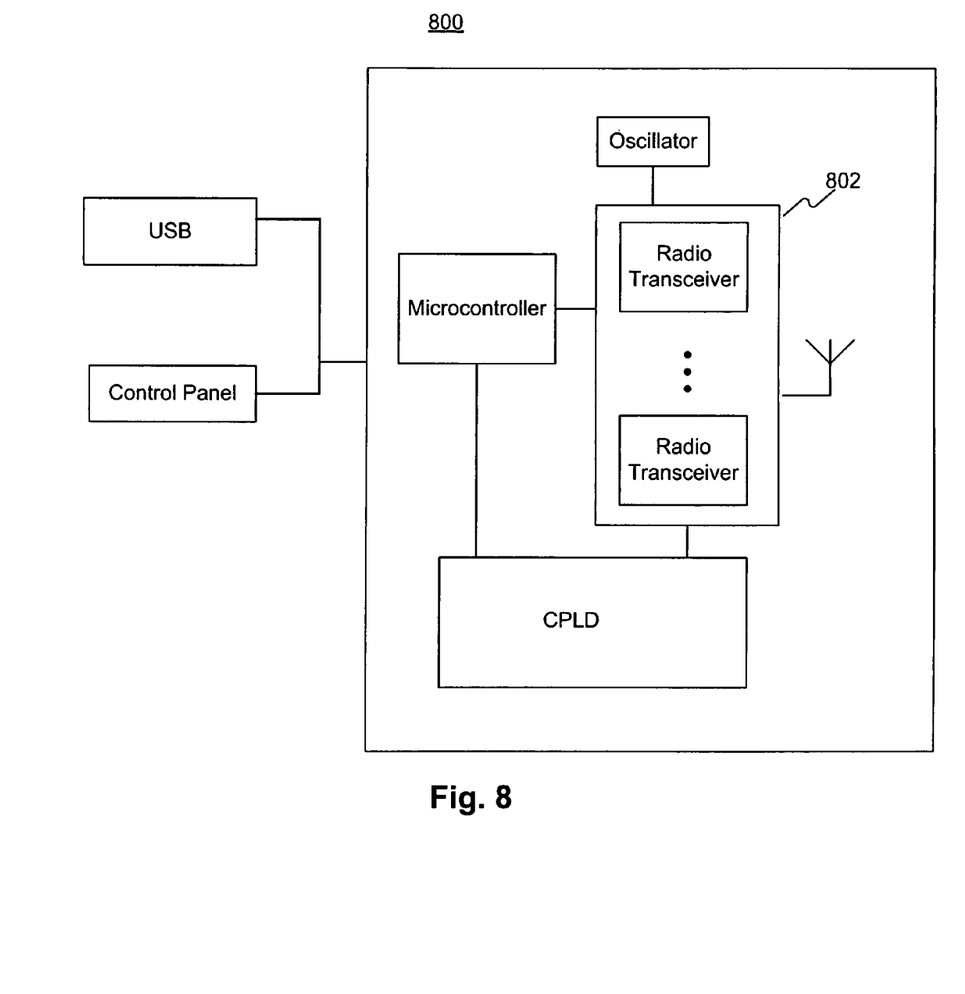
FIG. 8 is a block diagram of a transponder including a plurality of radio transceivers, according to an exemplary embodiment.

In exemplary embodiments, the initiator or the transponder may include more than one radio transceivers to perform distance measurements. FIG. 7 is a block diagram of an initiator 700 including a plurality of radio transceivers 702, and FIG. 8 is a block diagram of a transponder 800 including a plurality of radio transceivers 802, according to exemplary embodiments. For example, the radio transceivers 702 and the radio transceivers 802 may each be implemented using the CC2420 chip.

In exemplary embodiments, when multiple radio transceivers are used, each may generate skip counts from the measurement signal, thereby providing additional skip counts which can be averaged, or allowing the number of skips collected by each radio transceiver to be reduced. This may provide, in the first case, higher accuracy of the fine time estimate, or in the second case, a shorter measurement time.

Other embodiments of the invention will be apparent to those skilled in the art from consideration of the specification and practice of the invention disclosed herein. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A locating system, comprising:
    at least one initiator configured to operate at a first clock frequency, and to transmit a measurement signal including a first preamble; and
    at least one transponder configured to operate at a second clock frequency;
    wherein the transponder includes:
        a first transceiver configured to receive the measurement signal and to perform synchronization with the first preamble;
        a first programmable device configured to detect a first plurality of skips during the performance of synchronization, and to count a first plurality of numbers of clock cycles for the first plurality of skips; and
        the first transceiver configured to transmit a response signal to the initiator, the response signal including a second preamble and a data payload including the first plurality of numbers of clock cycles; and
    wherein the initiator includes:
        a second transceiver configured to receive the response signal and to perform synchronization with the second preamble;
        a second programmable device configured to detect a second plurality of skips during the performance of synchronization, and to count a second plurality of numbers of clock cycles for the second plurality of skips; and
        a microcontroller configured to calculate a first time adjustment based on the first plurality of numbers of clock cycles, to calculate a second time adjustment based on the second plurality of numbers of clock cycles, and to calculate, based on a coarse time estimate, the first time adjustment, and the second time adjustment, a distance between the initiator and the transponder for determining a location of the transponder.

2. The system of claim 1, wherein the first programmable device is further configured to:
    monitor a number of clock cycles in each data cycle; and
    detect a change of the number of clock cycles in a data cycle to detect a skip.

3. The system of claim 1, wherein the second programmable device is further configured to:
    monitor a number of clock cycles in each data cycle; and
    detect a change of the number of clock cycles in a data cycle to detect a skip.

4. The system of claim 1, wherein the initiator further comprises:
    a processor configured to relay the calculated distance as distance data to a primary initiator or a computer.

5. The system of claim 1, wherein the initiator further comprises:
    a control panel for providing a user control interface.

6. The system of claim 1, wherein the initiator further comprises:
    an interface for outputting distance data and for charging a battery which provides operating power to the initiator.

7. The system of claim 1, wherein the initiator is a first initiator and the system includes a plurality of second initiators, the first initiator being further configured to collect distance data from the second initiators, and to provide its own distance data and the collected distance data for a computer to determine the location of the transponder.

8. The system of claim 1, wherein the initiator further comprises:
    an oscillator configured to provide a reference clock signal.

9. The system of claim 8, wherein the second programmable device comprises:
    a phase-locked loop (PLL) clock generator configured to generate the first clock frequency based on the reference clock signal.

10. The system of claim 1, wherein:
    the first programmable device is further configured to count a first number of clock cycles between the reception of the measurement signal and the transmission of the response signal;
    the second programmable device is further configured to count a second number of clock cycles between the transmission of the measurement signal and the reception of the response signal; and
    the microcontroller is further configured to calculate the coarse time estimate based on the first number of clock cycles and the second number of clock cycles.

11. The system of claim 1, wherein the second radio transceiver is further configured to resynchronize with the second preamble by adjusting ahead or back a predetermined fraction of one clock cycle corresponding to the first clock frequency.

12. The system of claim 1, wherein the transponder further comprises:
    a control panel for providing a user control interface.

13. The system of claim 1, wherein the transponder further comprises:
    an interface for configuring the transponder and for charging a battery which provides operating power to the transponder.

14. The system of claim 1, wherein the transponder further comprises:
an oscillator configured to provide the second clock frequency.

15. The system of claim 1, wherein the first radio transceiver is further configured to resynchronize with the first preamble by adjusting ahead or back a predetermined fraction of one clock cycle corresponding to the second clock frequency.

16. A locating method, comprising:
transmitting, by a first radio device operating at a first clock frequency, a measurement signal including a first preamble;
receiving, by a second radio device operating at a second clock frequency, the measurement signal;
performing, by the second radio device, synchronization with the first preamble;
detecting, by the second radio device, a first plurality of skips during the performance of synchronization, and counting a first plurality of numbers of clock cycles for the first plurality of skips;
transmitting, by the second radio device, a response signal to the first radio device, the response signal including a second preamble and a data payload including the first plurality of numbers of clock cycles;
receiving, by the first radio device, the response signal;
performing, by the first radio device, synchronization with the second preamble;
detecting, by the first radio device, a second plurality of skips during the performance of synchronization, and counting a second plurality of numbers of clock cycles for the second plurality of skips;
calculating, by the first radio device, a first time adjustment based on the first plurality of numbers of clock cycles, and a second time adjustment based on the second plurality of numbers of clock cycles; and
calculating by the first radio device, based on a coarse time estimate, the first time adjustment, and the second time adjustment, a distance between the first and second radio devices for determining a location of the second radio device.

17. The method of claim 16, wherein detecting the first plurality of skips comprises:
monitoring a number of clock cycles in each data cycle; and
detecting a change of the number of clock cycles in a data cycle to detect a skip.

18. The method of claim 16, wherein detecting the second plurality of skips comprises:
monitoring a number of clock cycles in each data cycle; and
detecting a change of the number of clock cycles in a data cycle to detect a skip.

19. The method of claim 16, further comprising:
collecting, by the first radio device, distance data indicating a distance between a third radio device and the second radio device; and
providing, by the first radio device, the collected distance data for a computer to determine the location of the second radio device.

20. The method of claim 16, further comprising:
generating, by a phase-locked loop (PLL) clock generator, the first clock frequency based on a reference clock signal.

21. The method of claim 16, further comprising:
counting, by the first radio device, a first number of clock cycles between the transmission of the measurement signal and the reception of the response signal;
counting, by the second radio device, a second number of clock cycles between the reception of the measurement signal and the transmission of the response signal; and
calculating, by the first radio device, the coarse time estimate based on the first number of clock cycles and the second number of clock cycles.

22. The method of claim 16, comprising resynchronizing the first radio device with the second preamble by adjusting ahead or back a predetermined fraction of one clock cycle corresponding to the first clock frequency.

23. The method of claim 16, comprising resynchronizing the second radio device with the first preamble by adjusting ahead or back a predetermined fraction of one clock cycle corresponding to the second clock frequency.

24. A computer-readable storage medium including instructions, executable by a processor, for instructing first and second radio devices to perform a locating method, the first radio device being configured to operate at a first clock frequency, the second radio device being configured to operate at a second clock frequency, the method comprising:
transmitting, by the first radio device, a measurement signal including a first preamble;
receiving, by the second radio device, the measurement signal;
performing, by the second radio device, synchronization with the first preamble;
detecting, by the second radio device, a first plurality of skips during the performance of synchronization, and counting a first plurality of numbers of clock cycles for the first plurality of skips;
transmitting, by the second radio device, a response signal to the first radio device, the response signal including a second preamble and a data payload including the first plurality of numbers of clock cycles;
receiving, by the first radio device, the response signal;
performing, by the first radio device, synchronization with the second preamble;
detecting, by the first radio device, a second plurality of skips during the performance of synchronization, and counting a second plurality of numbers of clock cycles for the second plurality of skips;
calculating, by the first radio device, a first time adjustment based on the first plurality of numbers of clock cycles, and a second time adjustment based on the second plurality of numbers of clock cycles; and
calculating by the first radio device, based on a coarse time estimate, the first time adjustment, and the second time adjustment, a distance between the first and second radio devices for determining a location of the second radio device.

25. The computer-readable storage medium of claim 24, wherein the instructions generate a graphic user interface (GUI) on the computer, to show information regarding the location of the second radio device.

26. A first radio device configured to operate at a first clock frequency for use in a locating system, comprising:
a transceiver configured to transmit to a second radio device a measurement signal including a first preamble, to receive from the second radio device a response signal including a second preamble, and to perform synchronization with the second preamble;

a programmable device configured to detect a plurality of skips during the performance of synchronization, and to count a plurality of numbers of clock cycles for the plurality of skips; and a microcontroller configured to calculate a time adjustment based on the plurality of numbers of clock cycles, and to calculate, based on a coarse time estimate and the time adjustment, a distance between the first radio device and the second radio device for determining a location of the second radio device.

27. The first radio device of claim 26, wherein the programmable device is further configured to:

monitor a number of clock cycles in each data cycle; and
detect a change of the number of clock cycles in a data cycle to detect a skip.

28. The first radio device of claim 26, further comprising:
a processor configured to relay the calculated distance as distance data to a third radio device or a computer.

29. The first radio device of claim 26, further comprising:
a control panel for providing a user control interface.

30. The first radio device of claim 26, further comprising:
an interface for outputting distance data and for charging a battery which provides operating power to the first radio device.

31. The first radio device of claim 26, further comprising:
an oscillator configured to provide a reference clock signal.

32. The first radio device of claim 31, wherein the programmable device comprises:

a phase-locked loop (PLL) clock generator configured to generate the first clock frequency based on the reference clock signal.

33. The first radio device of claim 26, wherein:

the programmable device is configured to count a number of clock cycles between the transmission of the measurement signal and the reception of the response signal; and the microcontroller is further configured to calculate the coarse time estimate based on the number of clock cycles.

34. The first radio device of claim 26, wherein the radio transceiver is further configured to resynchronize with the second preamble by adjusting ahead or back a predetermined fraction of one clock cycle corresponding to the first clock frequency.

35. A first radio device configured to operate at a first clock frequency for use in a locating system, comprising:

a transceiver configured to receive from a second radio device a measurement signal including a first preamble and to perform synchronization with the first preamble; and a programmable device configured to detect a plurality of skips during the performance of synchronization, and to count a plurality of numbers of clock cycles for the plurality of skips;

wherein the transceiver is configured to transmit to the second radio device a response signal, the response signal including a second preamble and a data payload including the plurality of numbers of clock cycles.

36. The first radio device of claim 35, wherein the programmable device is further configured to:

monitor a number of clock cycles in each data cycle; and
detect a change of the number of clock cycles in a data cycle to detect a skip.

37. The first radio device of claim 35, wherein the programmable device is further configured to:

count a number of clock cycles between the reception of the measurement signal and the transmission of the response signal.

38. The first radio device of claim 35, further comprising:
a microcontroller configured to control the programmable device and the radio transceiver.

39. The first radio device of claim 35, further comprising:
a control panel for providing a user control interface.

40. The first radio device of claim 35, further comprising:
an interface for configuring the first radio device and for charging a battery which provides operating power to the first radio device.

41. The first radio device of claim 35, further comprising:
an oscillator configured to provide the first clock frequency.

42. The first radio device of claim 35, wherein the radio transceiver is further configured to resynchronize with the first preamble by adjusting ahead or back a predetermined fraction of one clock cycle corresponding to the first clock frequency.

43. A locating method for use by a first radio device in a locating system, the first radio device being configured to operate at a first clock frequency, the method comprising:

transmitting to a second radio device a measurement signal including a first preamble;
receiving from the second radio device a response signal including a second preamble;
performing synchronization with the second preamble;
detecting a plurality of skips during the performance of synchronization;
counting a plurality of numbers of clock cycles for the plurality of skips;
calculating a time adjustment based on the plurality of numbers of clock cycles;
counting a number of clock cycles between the transmission of the measurement signal and the reception of the response signal;
calculating a coarse time estimate based on the number of clock cycles; and
calculating, based on the coarse time estimate and the time adjustment, a distance between the first radio device and the second radio device for determining a location of the second radio device.

44. A locating method for use by a first radio device in a locating system, the first radio device being configured to operate at a first clock frequency, the method comprising:

receiving from a second radio device a measurement signal including a first preamble;
performing synchronization with the first preamble;
detecting a plurality of skips during the performance of synchronization;
counting a plurality of numbers of clock cycles for the plurality of skips;
counting a number of clock cycles between the reception of the measurement signal and transmission of a response signal; and
transmitting to the second radio device the response signal, the response signal including a second preamble and a data payload including the plurality of numbers of clock cycles and the number of clock cycles, for the second radio device to determine a distance between the first radio device and the second device.

45. A computer-readable storage medium including instructions, executable by a processor, for instructing a first radio device to perform a locating method, the first radio device being configured to operate at a first clock frequency, the method comprising:
> transmitting to a second radio device a measurement signal including a first preamble;
> receiving from the second radio device a response signal including a second preamble;
> performing synchronization with the second preamble;
> detecting a plurality of skips during the performance of synchronization;
> counting a plurality of numbers of clock cycles for the plurality of skips;
> calculating a time adjustment based on the plurality of numbers of clock cycles;
> counting a number of clock cycles between the transmission of the measurement signal and the reception of the response signal;
> calculating a coarse time estimate based on the number of clock cycles; and
> calculating, based on the coarse time estimate and the time adjustment, a distance between the first radio device and the second radio device for determining a location of the second radio device.

46. A computer-readable storage medium including instructions, executable by a processor, for instructing a first radio device to perform a locating method, the first radio device being configured to operate at a first clock frequency, the method comprising:
> receiving from a second radio device a measurement signal including a first preamble;
> performing synchronization with the first preamble;
> detecting a plurality of skips during the performance of synchronization;
> counting a plurality of numbers of clock cycles for the plurality of skips;
> counting a number of clock cycles between the reception of the measurement signal and transmission of a response signal; and
> transmitting to the second radio device the response signal, the response signal including a second preamble and a data payload including the plurality of numbers of clock cycles and the number of clock cycles, for the second radio device to determine a distance between the first radio device and the second device.

* * * * *